United States Patent [19]

Duke

[11] 4,132,807
[45] Jan. 2, 1979

[54] PELLETIZING COTTON LINT

[76] Inventor: Gene L. Duke, P.O. Box 988, Brownfield, Tex. 79316

[21] Appl. No.: 803,154

[22] Filed: Jun. 3, 1977

Related U.S. Application Data

[62] Division of Ser. No. 277,400, Aug. 2, 1972, Pat. No. 4,055,608.

[51] Int. Cl.$^2$ .......................... A23K 1/02; A23K 1/14
[52] U.S. Cl. ........................................ 426/2; 426/807; 426/635
[58] Field of Search ................ 162/95; 47/5, DIG. 9; 426/807, 2, 615, 635, 512, 516, 658

[56] References Cited

U.S. PATENT DOCUMENTS

| | | | |
|---|---|---|---|
| 1,140,638 | 5/1915 | Walker | 127/37 |
| 1,425,688 | 8/1922 | Polhamus | 47/5 |
| 1,919,623 | 7/1933 | Dreyfus | 127/37 |
| 2,198,785 | 4/1940 | Mohr | 127/37 |
| 2,284,500 | 5/1942 | Warth | 127/37 |
| 2,744,824 | 5/1956 | Lent | 426/635 |
| 2,789,906 | 4/1957 | Zick | 426/69 |
| 2,901,339 | 8/1959 | Boomer | 71/23 |
| 2,960,406 | 11/1960 | Cardon | 426/71 |
| 3,432,529 | 3/1969 | Depmer | 426/425 |
| 3,502,478 | 3/1970 | Erwin | 426/69 |

Primary Examiner—Hiram H. Bernstein
Attorney, Agent, or Firm—Wendell Coffee

[57] ABSTRACT

Lint removed from cottonseed by dry acid is compacted by pelletizing in a standard pellet mill.

15 Claims, No Drawings

PELLETIZING COTTON LINT

CROSS-REFERENCE TO RELATED APPLICATIONS:

This is a division of application Ser. No. 277,400, filed Aug. 2, 1972, issued as U.S. Pat. No. 4,055,608 on Oct. 25, 1977.

BACKGROUND OF THE INVENTION

1. Field of the Invention

This invention relates to acid delinting of cottonseed and more particularly to disposing of the lint therefrom.

2. Description of the Prior Art

When cotton is ginned, the seed are not thoroughly cleaned but are left "fuzzy". The fuzzy cottonseed, which are an important by-product of the ginning process, are usually disposed of in one of two ways.

Most of the cottonseed have the oil extracted from them and then the residue, in the form of meal, is sold for cattle feed. Before the extraction of the oil, the seed are delinted, usually by a saw process. The lint thus removed is baled in 500 pound bales and sold through regular channels of trade. The product is known as "linters", which are normally used in various chemical processes as a source of cellulose, as well as stuffing for upholstery.

The remaining cottonseed are used for planting purposes. The cottonseed may be planted in the fuzzy condition. However, more commonly, they are delinted. One process of delinting is to saw delint them. In such case, lint is disposed of as above. The more common process of delinting cottonseed used for planting purposes is by the dry acid process. The dry acid process is a well known commercial process in which the seed are exposed to anhydrous hydrogen chloride (HCl). The seed are thereafter tumbled in a perforated drum to separate the seed and lint. The seed are then neutralized by exposure to anhydrous ammonia.

In this specification, "dry acid process" will be used to refer to this process although it is also known as the gas process.

After having rubbed the lint off the seed in the perforated tumbling drum, the lint presently customarily is blown to an incinerator where it is burned. This is a source of atmospheric polution, but burning is still permitted under polution laws of the State of Texas because no better way is known to dispose of this waste product of an essential industry.

SUMMARY OF THIS INVENTION

I have found a new way of disposing and utilizing of the fuzz or lint produced from dry acid delinting. I dispose of the lint by pelletizing it through a standard pelletizing machine called pellet mill. After it has been pelletized, it has some value for the cellulose content. Cattle will eat these pellets even if they are pure lint. Pellets of pure lint may be mixed in with other feed and fed to cattle in this form.

Larger pellets are sometimes called cubes in the trade, but for convenience, I refer to them as pellets in this application.

Also, in the preparation of cottonseed for planting purposes, certain culls are removed from the heavier seed. If the culls are mixed with the lint, this forms a more palatable and nutritious feed for cattle. Molasses can be added to improve the physical characteristics of the pellet as well as improve the palatability of the pellet.

Even if the pellets have no value of other use, they could still be spread upon ground and plowed under in cultivated fields, thus disposing of the lint. They would do no harm to the fields (where the soil is basic rather than acidic) and would be of some advantage as an adjunct to the soil. After it has been removed from the seed, it is a simple matter to expose the lint to anhydrous ammonia to neutralize the acid; therefore, making it more desirable as a feed and less corrosive to handle.

Expressed in another way, I have taken a waste product which is difficult to dispose of and turned it into a by-product having value.

An object of this invention is to use or dispose of lint produced by dry acid delinting of cottonseed.

Other objects are to achieve the above with a product that is sturdy, compact and durable, yet inexpensive and easy to manufacture and handle.

Further objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description.

DESCRIPTION OF THE PREFERRED EMBODIMENTS

In all examples, the lint was from dry acid delinting of cottonseed.

EXAMPLE 1.

Lint from a dry acid delinting plant was fed directly into a pellet mill with one-half inch round die. The die became rather hot and the pellet produced was also hot, but a stable half-inch diameter pellet of pure lint was produced. The pellet had a pH of 3.0.

EXAMPLE 2.

One hundred pounds of lint and 100 pounds of culls from dry acid delinting were mixed thoroughly and fed directly into a pellet mill having a half-inch round die. The product formed a satisfactory pellet with considerably less temperature than when using pure cottonseed lint. The pellets were trough fed where range cattle were grazing and the cattle ate the pellets.

An analysis of the pellet showed the following:

| | |
|---|---|
| Protein | 16.02% |
| Fat | 11.08 |
| Fiber | 44.00 |
| pH | 3.1 |

EXAMPLE 3.

One hundred pounds of lint and 200 pounds of culls were mixed thoroughly and fed directly into a pellet mill. A stable half-inch round pellet was formed from the one-half inch die. The pellets were trough fed where range cattle were grazing and the cattle ate the pellets.

An analysis thereof showed the following:

| | |
|---|---|
| Protein | 21.57% |
| Fat | 14.82 |
| Fiber | 33.62 |
| pH | 3.7 |

EXAMPLE 5.

One hundred pounds of lint and 100 pounds of culls and 40 pounds of molasses were mixed thoroughly and fed to a pellet mill with a ⅝ inch diameter round die. A good, hard and durable pellet was produced.
The pellet had the following analysis:

| | |
|---|---|
| Nitrogen | 1.83% |
| Ammonia | 2.23 |
| Protein | 11.46 |
| Fat | 8.34 |
| Moisture | 10.10 |
| Fiber | 32.43 |
| Ash | 5.07 |
| Nitrogen-free extract | 32.43 |
| Digestible energy KCAL/LB | 982.5 |
| Total digestible nutrients | 49.13 |
| pH | 3.5 |

The pellets were trough fed and were eaten readily by the range cattle.

EXAMPLE 6.

Fifty pounds lint, 50 pounds culls and 10 pounds of molasses were thoroughly mixed together and fed directly to a pellet mill with ¼ inch round die. A good, hard and durable pellet was formed. However, because of the small size of the die, production was slow. Cattle ate the product.

A physical examination of the product produced through the ¼ inch die showed the culls to have been crushed as they were forced through the die. This seemed to result in a better product than with the use of either a ½ inch die or ⅝ inch die, however, as noted before, it took considerably longer for the product to go through the smaller die.

EXAMPLE 7.

Fifty pounds of lint and 50 pounds of culls and 10 pounds of molasses were fed directly to a pellet mill with 3/16th inch die. A good pellet was formed but production was slow. It was concluded that on a commercial economic basis, the 3/16th inch die was as small a die that would be commercially feasible. Cattle ate the product.

EXAMPLE 8.

Fifty pounds of lint was mixed with 50 pounds of culls and 10 pounds of molasses and directly fed to a pellet mill having a ¾ inch square die. A good, hard and durable pellet was formed. The culls were not crushed as they went through the die. Production was at a high rate per time. The product was presented to cattle and they ate it.

EXAMPLE 9.

One hundred pounds of lint was mixed with 100 pounds of culls and 10 pounds of molasses. This mixture was fed through a pellet mill having a 1 inch round die. Although pellets were formed which were good and durable, they were somewhat crumbly. Also, they seemed to crumble more upon handling than smaller sizes. It was concluded that 1 inch diameter pellets were about the maximum of pellets desirable to manufacture. Cattle ate the product.

EXAMPLE 10.

Lint from dry acid delinting of cottonseed was neutralized by exposing the lint to an atmosphere of anhydrous ammonia as the lint was being conveyed in an auger. The neutralized lint was fed to a pellet mill having ½ inch round die; a satisfactory hard, durable pellet was formed. Analysis showed the product to have a pH of 6.5.

As the result of this, it is believed that by adjusting the length of time the lint is neutralized, if desired by adding ammonia to the lint, a product could be produced having a pH of 8.5.

EXAMPLE 11.

Fifty pounds of lint, 30 pounds of culls and 20 pounds of ground grain sorghum and 10 pounds of molasses were mixed and put through the pellet mill having ½ inch round die. A good, satisfactory pellet was formed and eaten by cattle when presented to them.

EXAMPLE 12.

Fifty pounds of lint, 30 pounds of culls and 20 pounds of cracked corn and 10 pounds of molasses were mixed and put through the pellet mill having ½ inch round die. A good, satisfactory pellet was formed and was eaten by the cattle when presented to them.

EXAMPLE 13.

Fifty pounds of lint, 30 pounds of culls and 20 pounds of alfalfa meal and 10 pounds of molasses were mixed and put through the pellit mill having ½ inch round die. A good, satisfactory pellet was formed and was eaten by the cattle when presented to them.

EXAMPLE 14.

Fifty pounds of lint, 10 pounds of ground sorghum, 10 pounds of cottonseed meal and 10 pounds of molasses were mixed and put through the pellet mill having ½ inch round die. A good, staisfactory pellet was formed and was eaten by the cattle when presented to them.

EXAMPLE 15.

Fifty pounds of lint, 20 pounds of alfalfa meal, 20 pounds of ground corn and 10 pounds of molasses were mixed and put through the pellet mill having ½ inch die. A good, satisfactory pellet was produced and was eaten when presented to the cattle.

From these examples and particularly from the examples using lint and culls, lint and corn, lint and grain sorghum, lint and alfalfa meal, and lint and cottonseed meal, it was concluded that the lint could be mixed with any standard, common cattle feed to form a product that cattle would eat; therefore, disposing of the product. Better results were had with the lint being neutralized with anhydrous ammonia before pelletizing if it is to be used for cattle feed. Also, it was concluded that the product has better handling characteristics and less corrosion for storing if it is neutralized before pelletizing.

Also, it was concluded that with the efficient handling of the lint as produced by the dry gas process, dry gas process would be an efficient means of delinting the seed before the extraction of oil for the cottonseed oil mills rather than the use of saw delinting.

Various binders other than molasses could be included, however, it is believed that their inclusion is not necessary, but at the time of the filing of this application, work is being done upon this.

By cattle, I mean to include bovine, sheep, goats and other ruminants.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

SUBJECT MATTER CLAIMED FOR PROTECTION

I claim as my invention:

1. The method of handling lint produced as a by-product from the dry acid process of delinting cottonseed comprising:
   a. pelletizing the lint by
   b. extruding the lint through a die in a standard pellet mill.
2. The invention as defined in claim 1 with an additional limitation of
   c. adding not more than twice as much cottonseed culls as lint to the lint before pelletizing.
3. The invention as defined in claim 1 with an additional limitation of
   c. adding not more than half as much molasses and not more than twice as much cottonseed culls as lint to the lint before pelletizing.
4. The invention as defined in claim 1 with an additional limitation of
   c. adding not more than twice as much conventional cattle feed as lint to the lint before pelletizing.
5. The invention as defined in claim 1 with an additional limitation of
   c. feeding the pellets to cattle.
6. The invention as defined in claim 1 with an additional limitation of
   c. neutralizing the lint by exposure to $NH_3$ before pelletizing.
7. The invention as defined in claim 6 with an additional limitation of
   d. feeding the pellets to cattle.
8. The invention as defined in claim 7 with an additional limitation of
   e. adding not more than twice as much cottonseed culls as lint to the lint before pelletizing.
9. The invention as defined in claim 7 with an additional limitation of
   e. adding not more than half as much molasses and not more than twice as much cottonseed culls as lint as lint to the lint before pelletizing.
10. The invention as defined in claim 7 with an additional limitation of
    e. adding not more than three times as much conventional cattle feed as lint to the lint before pelletizing.
11. The method of utilizing lint produced by dry acid delinting of cotton seed comprising feeding said product to cattle.
12. The method of claim 11 with an additional limitation of adding cotton seed culls to the product before feeding.
13. The method of claim 11 with an additional limitation of adding conventional cattle feed to the product before feeding.
14. The method of claim 1 with an additional limitation of adding molasses to the product before feeding.
15. The method of claim 11 with an additional limitation of adding cotton seed culls and molasses to the product before feeding.

* * * * *